US010027595B2

(12) United States Patent
Lai et al.

(10) Patent No.: US 10,027,595 B2
(45) Date of Patent: Jul. 17, 2018

(54) SYSTEM AND METHOD FOR PROVIDING A WORK MANAGER IN A MULTITENANT APPLICATION SERVER ENVIRONMENT

(71) Applicant: Oracle International Corporation, Redwood Shores, CA (US)

(72) Inventors: Anthony Lai, Cupertino, CA (US); Nazrul Islam, Santa Clara, CA (US); Rajiv Mordani, Sunnyvale, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 163 days.

(21) Appl. No.: 14/747,853

(22) Filed: Jun. 23, 2015

(65) Prior Publication Data

US 2015/0372937 A1 Dec. 24, 2015

Related U.S. Application Data (60) Provisional application No. 62/016,059, filed on Jun. 23, 2014.

(51) Int. Cl.
| | |
|---|---|
| *G06F 15/173* | (2006.01) |
| *H04L 12/911* | (2013.01) |
| *H04L 29/08* | (2006.01) |
| *G06F 9/50* | (2006.01) |

(52) U.S. Cl.
CPC ............ *H04L 47/70* (2013.01); *G06F 9/5077* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 6,845,503 | B1 * | 1/2005 | Carlson | G06F 8/65 |
| | | | | 717/166 |
| 9,667,703 | B1 * | 5/2017 | Vetter | H04L 67/10 |
| 2005/0262507 | A1 | 11/2005 | Langen et al. | |
| 2005/0273456 | A1 * | 12/2005 | Revanuru | G06F 9/505 |
| 2006/0206887 | A1 * | 9/2006 | Dodge | G06F 9/4881 |
| | | | | 717/161 |

(Continued)

OTHER PUBLICATIONS

European Patent Office, International Searching Authority, International Search Report and Written Opinion dated Apr. 24, 2015 for International Application No. PCT/US2015/012268, 10 pages.

(Continued)

*Primary Examiner* — Phyllis A Book
(74) *Attorney, Agent, or Firm* — Tucker Ellis LLP (57) ABSTRACT

In accordance with an embodiment, described herein is a system and method for providing a work manager for use in an application server environment. In accordance with an embodiment, a system administrator can configure a partition work manager to provide partition work request prioritization (fair share value) to each partition within a multi-tenant application server environment. The system administrator can additionally configure the partition work manager to impose a minimum threads constraint limit, a partition capacity constraint, and/or a partition maximum threads constraint, all of which restrict the use of thread resources by the partitions within the environment.

20 Claims, 9 Drawing Sheets

(56) References Cited

U.S. PATENT DOCUMENTS

| | | | |
|---|---|---|---|
| 2008/0148254 A1 | 6/2008 | Hofer et al. | |
| 2008/0177976 A1 | 7/2008 | Branda et al. | |
| 2009/0019439 A1 | 1/2009 | Kwon et al. | |
| 2011/0185064 A1* | 7/2011 | Head | G06F 9/5077 709/226 |
| 2011/0213870 A1 | 9/2011 | Cai et al. | |
| 2012/0072597 A1 | 3/2012 | Teather et al. | |
| 2012/0102480 A1* | 4/2012 | Hopmann | G06F 8/656 717/172 |
| 2012/0110566 A1 | 5/2012 | Park | |
| 2013/0160115 A1 | 6/2013 | Venkataramanappa et al. | |
| 2013/0212279 A1* | 8/2013 | Dutta | G06F 9/5061 709/226 |
| 2013/0275976 A1* | 10/2013 | Dawson | G06F 9/5061 718/1 |
| 2014/0075030 A1* | 3/2014 | Wang | G06F 9/50 709/226 |
| 2014/0089928 A1 | 3/2014 | Stern et al. | |
| 2015/0095917 A1* | 4/2015 | Challenger | G06F 9/4843 718/104 |

OTHER PUBLICATIONS

European Patent Office, International Searching Authority, International Search Report and Written Opinion dated Sep. 24, 2015 for International Application No. PCT/US2015/037267, 13 pages.

* cited by examiner

SYSTEM AND METHOD FOR PROVIDING A WORK MANAGER IN A MULTITENANT APPLICATION SERVER ENVIRONMENT

CROSS-REFERENCE TO RELATED APPLICATIONS

This application claims the benefit of priority to U.S. Provisional Application titled "SYSTEM AND METHOD FOR PROVIDING A WORK MANAGER IN A MULTITENANT APPLICATION SERVER ENVIRONMENT", Application No. 62/016,059, filed Jun. 23, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud platform environments, and are particularly related to a system and method for providing a work manager for use in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for providing a work manager for use in an application server environment. In accordance with an embodiment, a system administrator can configure a partition work manager to provide partition work request prioritization (fair share value) to each partition within a multi-tenant application server environment. The system administrator can additionally configure the partition work manager to impose a minimum threads constraint limit, a partition capacity constraint, and/or a partition maximum threads constraint, all of which restrict the use of thread resources by the partitions within the environment.

DETAILED DESCRIPTION

In accordance with an embodiment, described herein is a system and method for providing a work manager for use in an application server environment. In accordance with an embodiment, a system administrator can configure a partition work manager to provide partition work request prioritization (fair share value) to each partition within a multi-tenant application server environment. The system administrator can additionally configure the partition work manager to impose a partition minimum threads constraint, a partition capacity constraint, and/or a partition maximum threads constraint, all of which restrict the use of thread resources by the partitions within the environment.

Application Server (e.g., Multi-Tenant, MT) Environment

Figure 1:
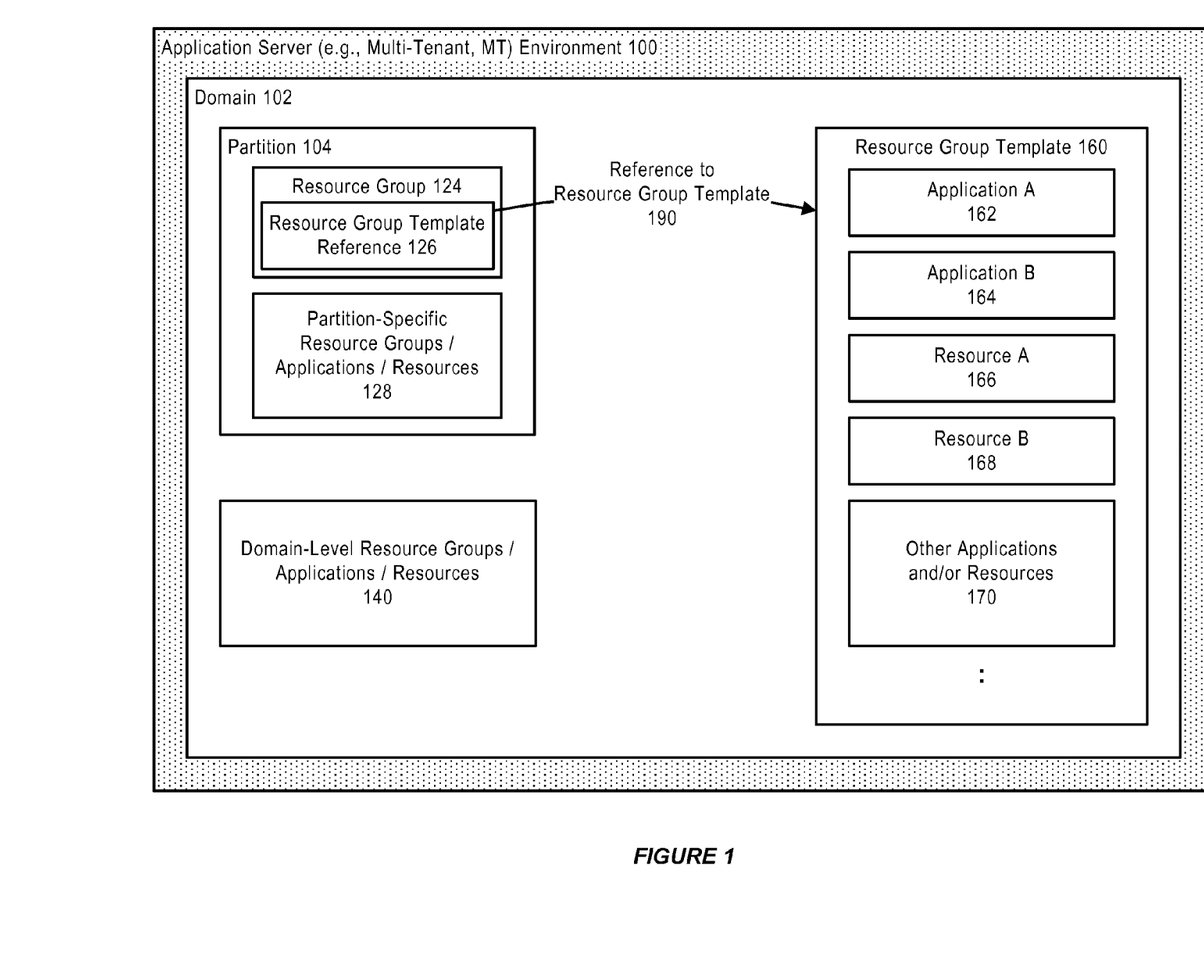
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
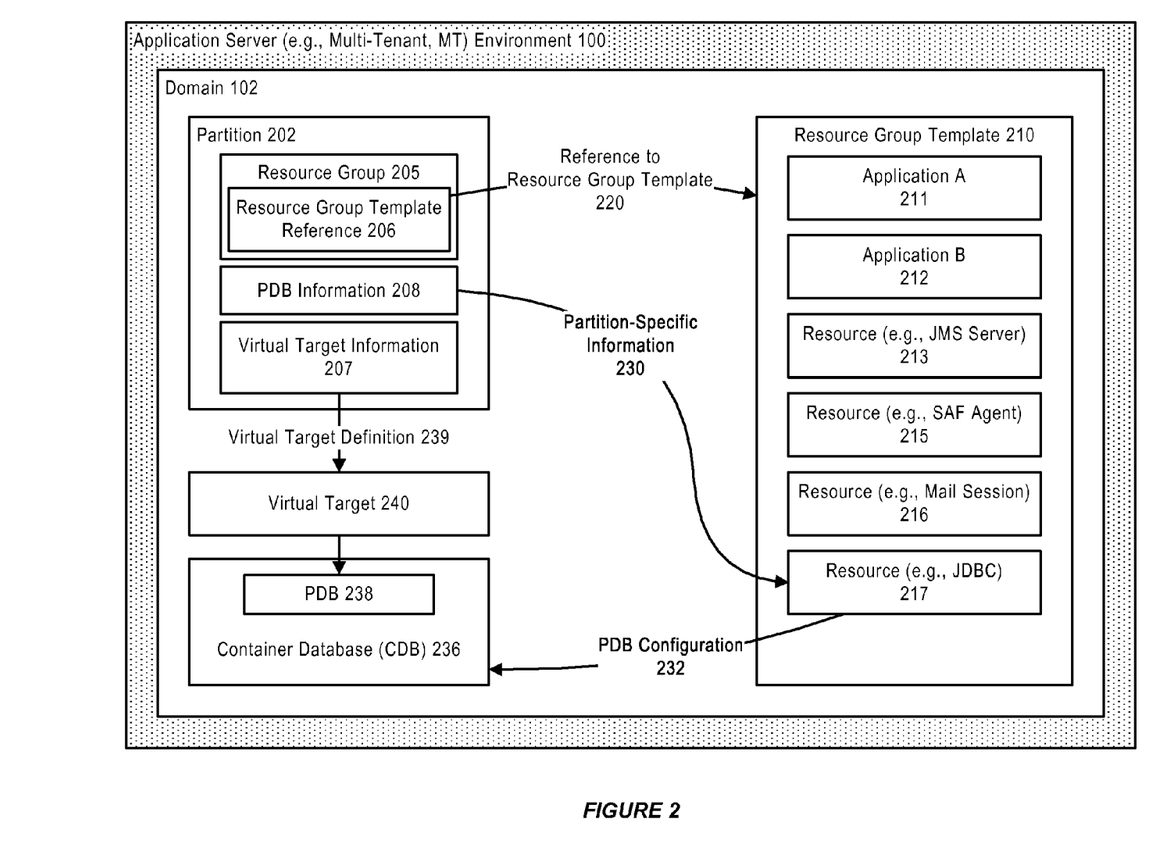
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
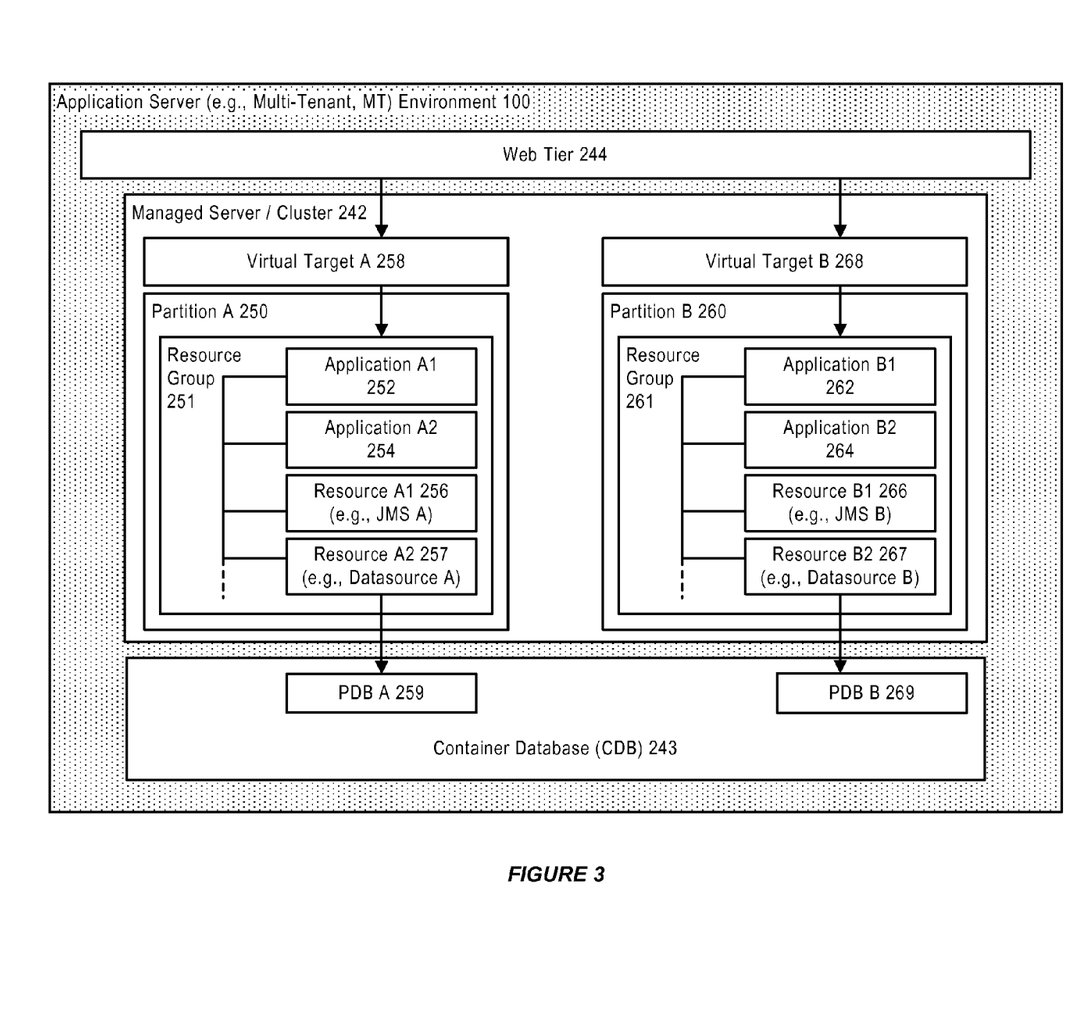
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
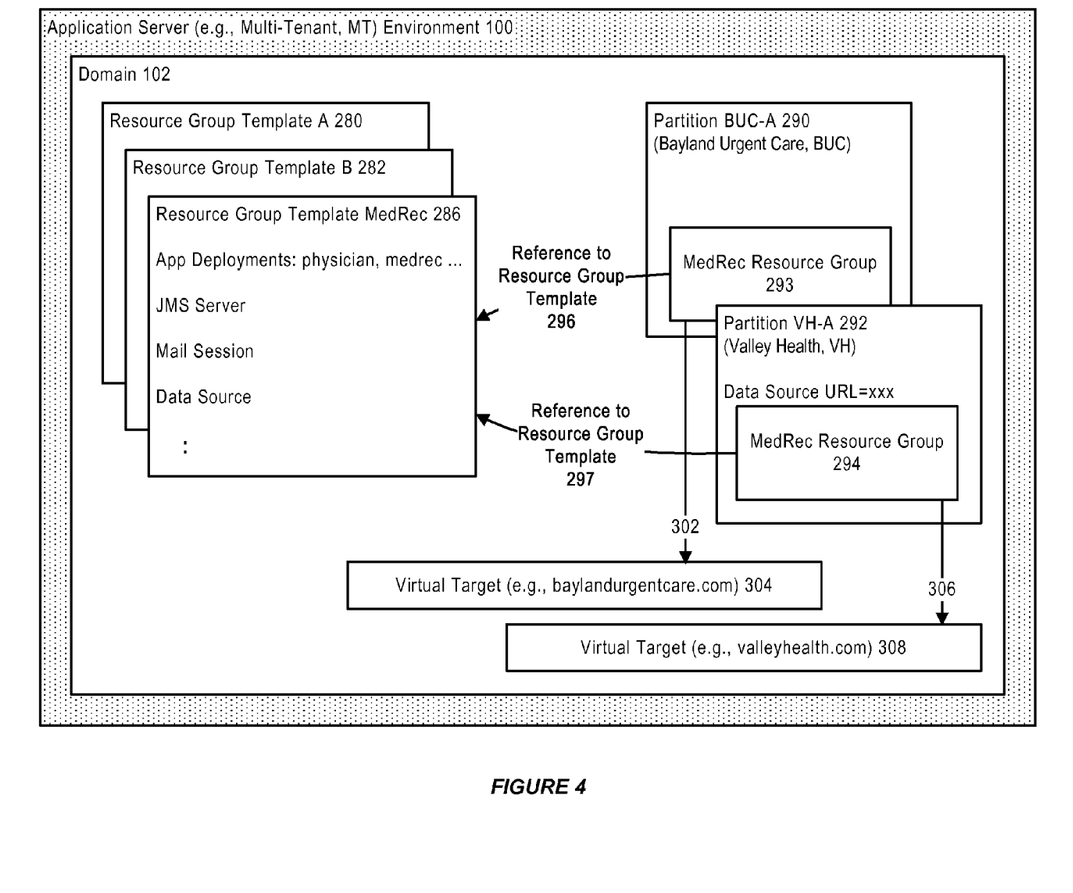
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
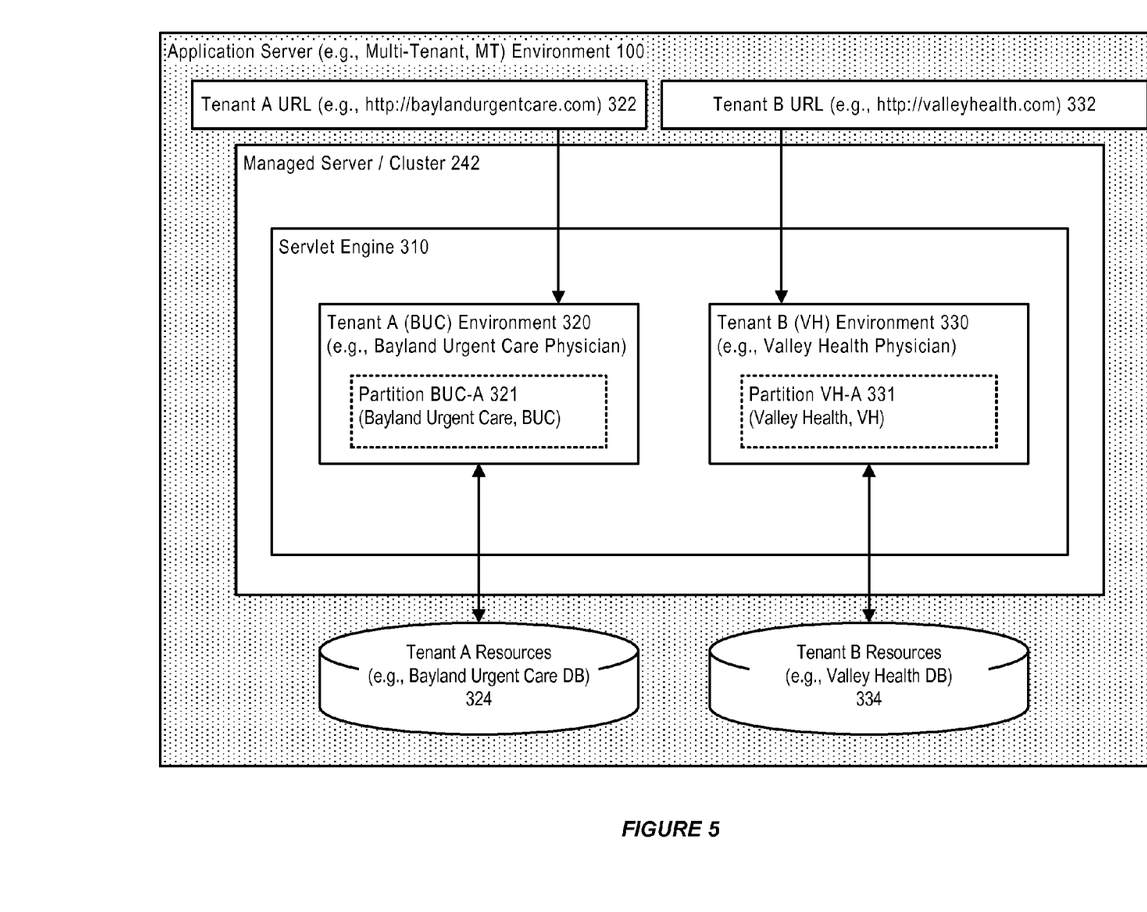
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Work Manager

As described above, in accordance with an embodiment, a partition is a slice of an application server (e.g., a WebLogic Server) domain created for a tenant or multiple tenants when running the application server in multitenant mode.

In accordance with an embodiment, thread usage among partitions is regulated so as to be fair and, their relative priority configurable by a system administrator. In accordance with an embodiment a work manager can be used to provide fairness and prioritization among partitions running in a same WLS instance.

In accordance with an embodiment, a work manager regulates the relative thread usage of thread resource provided by application server self-tuning thread pools to provide proper quality of service (QoS) and fairness among various partitions that share the same application server instance (e.g., a multitenant application server environment). Without it, an application from one partition and/or a partition administrator could potentially starve thread resources for other partitions, preventing them from functioning properly.

In accordance with an embodiment, the fairness by which a work manager can apportion shared thread resources to various partitions can be based on a number of factors, such as, for example, the various amounts various partitions pay for the services, the importance of each partition, and the demand each partition places on the shared threads.

Partition Work Managers—Relative Thread Resource Usage Per Partition

Figure 6:
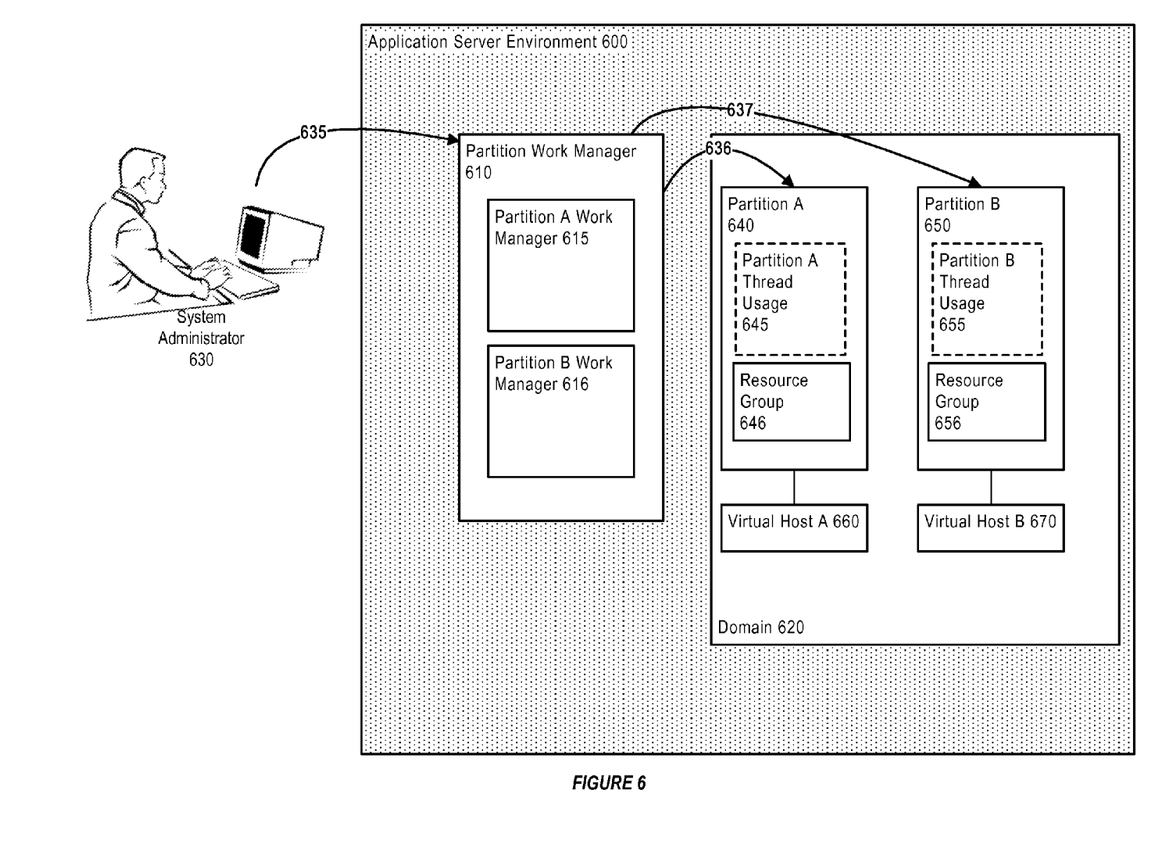
FIG. 6 illustrates the use of a partition work manager in a multitenant application server environment, in accordance with an embodiment.

FIG. 6 illustrates the use of a partition work manager in a multitenant application server environment, in accordance with an embodiment.

The embodiment depicted in FIG. 6 shows an application server environment 600, which includes a partition work manager 610, and a domain 620. The embodiment in FIG. 6 additionally includes a system administrator 630. The partition work manager 610 includes partition A work manager 615 and partition B work manager 616. The domain 620 includes partition A 640, partition B 650, virtual target A 660 and virtual target B 670. Within partitions A and B are partition A thread usage 645 and partition B thread usage 655, respectively. Further defined within partitions A and B are resource groups 646 and 656, respectively.

In accordance with an embodiment, the system administrator 630 configures the partition work manager 610 to regulate each partition's access to a thread pool, such as a WLS self-tuning thread pool, within the application server environment 600. The system administrator's configuration of the work manager regulates the relative thread usage of thread resources to provide proper QoS and fairness among various partitions that share the same application server instance. For example, there are generally several configurations that a system administrator can use (either individually or in combination with each other) when configuring the partition work manager 610, including, but not limited to, partition work request prioritization (or fair share value), partition minimum threads constraint, and partition capacity constraint.

In accordance with an embodiment, the system administrator 630 can configure the partition work manager 610 using a partition work request prioritization, or a fair share value. The system administrator 630 specifies, via communication path 635, within the partition work manager 610, a fair share value for each partition configured within the application server environment 600, for example, partition A 640 and partition B 650. This fair share value can be contained, for example, within the partition specific work managers contained within the partition work manager 610. The fair share value is a percentage of thread usage of that partition compared to the thread usage of all partitions. In addition, the fair share value originally assigned to a partition by the system administrator 630 can be updated and/or edited by the system administrator 630.

In accordance with an embodiment, the fair share value assigned to a partition is a number between 1 and 99. It is recommended that the sum of these values for all partitions running in a domain to be added up to 100. In case when they do not add up to 100, the application server environment 600 can assign thread usage times and or thread queue positions to different partitions based on their relative values.

For example, in accordance with an embodiment, system administrator 630 assigns a fair share value of twenty (20) to partition A 640, and a fair share value of thirty (30) to partition B 650. These fair share values are recorded in partition A work manager 615 and partition B work manager 616, respectively, within the partition work manager 610. At runtime, if it occurs that there are insufficient thread resources in the thread pool to handle all requests and pending work requests that are queued up for processing from partitions A and B, the work manager will allocate 40% of the thread-usage time to work requests (and queued requests) from applications from partition A 640, and 60% of the thread-usage time to work requests (and queued requests) from applications form partition B 650. This allocation of thread usage, e.g., partition A thread usage 645 and partition B thread usage 655, is a result of the system administrator setting the fair share values within the partition work manager 610.

In accordance with an embodiment, the system administrator 630 can configure the partition work manager 610 using a minimum thread constraint. The minimum thread constraint guarantees a designated number of threads from the thread pool that will be allocated to each partition, or application within a partition, in order to avoid deadlocks.

In accordance with an embodiment, the system administrator 630 can optionally provide a limit on the minimum threads constraint value for each partition within the application server environment 600. If the system administrator 630 configures such a limit, this would impose an upper limit on the minimum threads constraint values for each partition. In situations where the sum of the configured values of all minimum thread constraints in a partition exceeds such a configured value, a warning message can be logged and the application server environment 600 can automatically reduce the number of threads the thread pool would allocated for the constraints.

For example, in accordance with an embodiment, system administrator 630 configures a minimum threads constraint of 5 threads to a partition A 640. There are 2 minimum threads constraints defined in an application deployed to partition A; one has a configured value of 3, and the other has a configured value of 7. The self-tuning thread pool would only guarantees that 5 threads would be allocated to these two minimum threads constraint instead of the combined configured value of 10.

In certain embodiments, when a partition minimum thread constraint limit is configured by the system administrator 630 within the partition work manger 610 in addition to each partition within the application server environment having a fair share value set, this could result in a partition receiving more than its fair share of threads as the partition minimum thread constraint can overcome the fair share value.

In accordance with an embodiment, the system administrator 630 configures the partition work manager 610 using a partition shared capacity. The partition shared capacity places a limit on the number of work requests from a partition. This limit can include work requests that are either running or queued and waiting for an available thread. When the configured limit is exceeded, the application server environment 600 can reject further requests submitted from the limited partition. The value of the limit can be expressed as a percentage of the capacity of the application server environment 600, such as between 1% and 100%.

For example, in accordance with an embodiment, system administrator can set a partition shared capacity on partition A of 50%. The application server environment is configured with a value of 65536 in its shared capacity for work manager configuration. Because of the partition shared capacity on partition A, the work manager would start rejecting requests from partition A if the number of work requests exceeds 32738, which is 50% of 65536, the total capacity.

In accordance with an embodiment, the system administrator 630 configures the partition work manager 610 using a partition maximum threads constraint. This constraint can limit of the maximum number of threads in the self-tuning thread pool that are concurrently working on requests from a partition. This can be useful to prevent a partition from using more than its fair share of thread resources, especially in abnormal situations such as when threads are blocked on I/O waiting for responses from a remote server that is not responding. Setting a maximum threads constraint in such scenario would help ensure that some threads would be available for processing requests from other partitions in the system.

In accordance with an embodiment, a fair share value can, in addition to assigning a partition a fair share value of the available threads, assign order requests from partitions in a priority queue to be run when all available threads are currently in use. For example, a system administrator, via a partition work manager, assigns partition X a fair share value of 60, and partition Y a fair share value of 40. When the partitions have, between them, used all available threads in the source pool, then subsequent requests from the partitions are placed in a queue. The fair share value assigned to partitions X and Y can determine where in the queue a request from partition X will be place with respect to a request from partition Y. In the exemplified situation here, a request from partition X will be placed in front of the requests from partition Y in the queue since partition X has a higher fair share value than partition Y.

In accordance with an embodiment, the application server environment 600 can comprise a multitenant application server (MT) environment.

Partition-Level Work Managers

Figure 7:
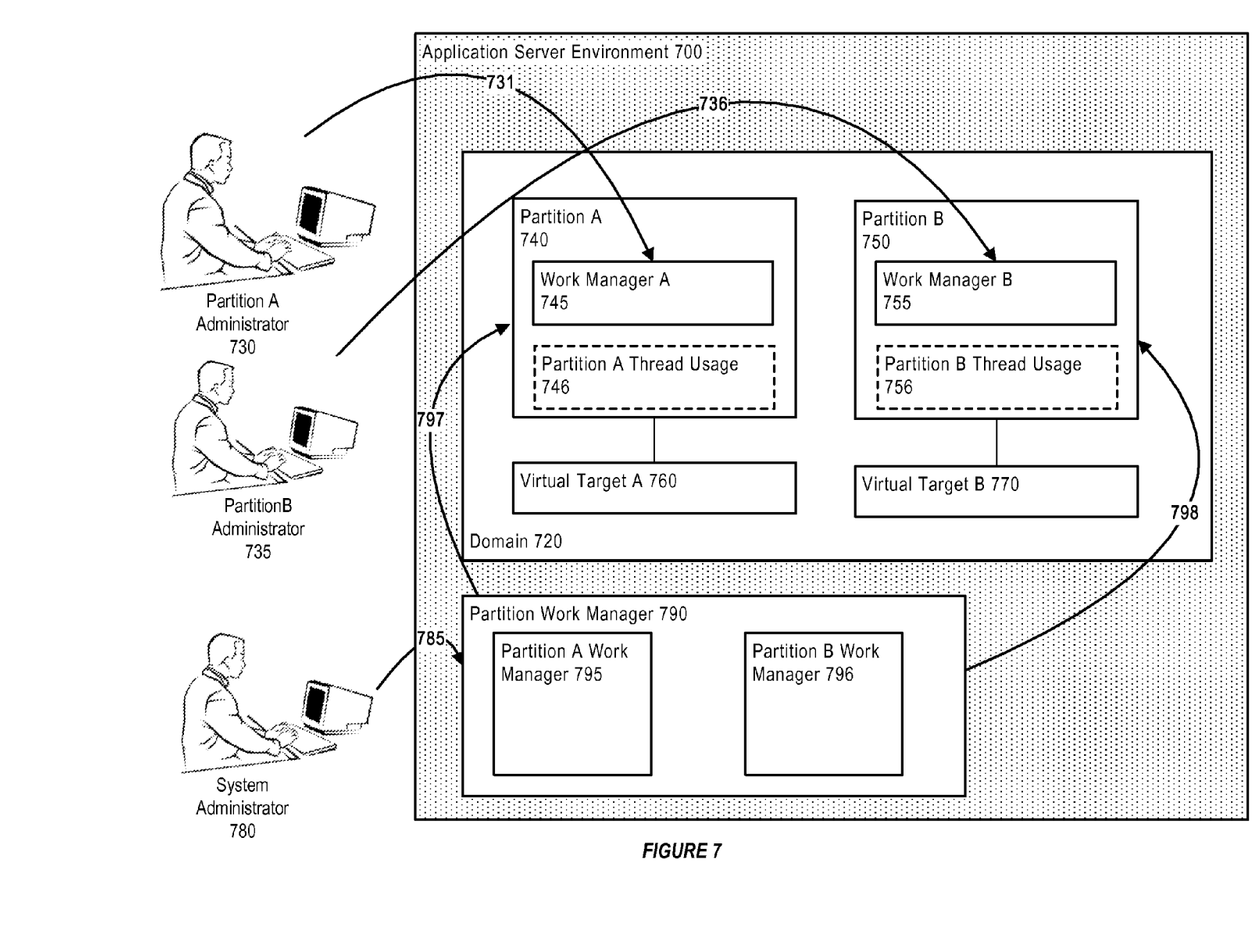
FIG. 7 illustrates the use of a partition work manager in a multitenant application server environment, in accordance with an embodiment

FIG. 7 illustrates the use of work managers in a multi-tenant application server environment, in accordance with an embodiment.

The embodiment depicted in FIG. 7 shows an application server environment 700, which includes a partition work manager 790, and a source domain 720. The embodiment in FIG. 7 additionally includes partition A administrator 730, partition B administrator 735, and system administration 780. The partition work manager 790 includes partition A work manager 795 and partition B work manager 796. The source domain 720 includes partition A 740, partition B 750, virtual target A 760 and virtual target B 770. Partition A 740 includes work manager A 745 and partition A thread usage 746. Partition B 760 includes work manager B 755 and partition B thread usage 756.

In an embodiment, similar to how a system administrator 780 can configure the partition work manager 790 to configure a fair share value for partitions A and B, partition administrators 730 and 735 can, with respect to their own partitions configure partition-level work managers that manage the work within their respective partitions. There are generally several configurations that partition administrators can use (either individually or in combination with each other) when configuring their respective partition work managers, including, but not limited to, work request prioritization (or fair share value), minimum threads constraint, maximum threads constraint.

For example, in an embodiment, partition administrators can configure their respective partition work managers using the fair share value. Partition A administrator can assign a fair share value of the total thread usage for partition A 740 amongst the applications running within partition A. The partition A administrator 730 would do this by configuring, via the communication path 731, work manager A 745 to assign a fair share value to the various applications running within partition A 740 (likewise, partition B administrator can configure work manager B via communication path 736). However, the threads from the global thread pool that are available to partition A 740 are still set by the partition work manager 790, and likewise for the threads available to partition B 750. The partition work manager 790 is configured by the system administrator 780 via communication path 785, and the configurations for partitions A and B (as described above) are stored in partition A work manager 795 and partition B work manager 796, respectively.

In an embodiment, a partition work manager acts as a template and an instance of each configured work manager created for each deployed application. For example, the partition work manager can be a default work manager. One instance of the default work manager can be created for each deployed application, and can be used for handling work requests from that application unless another dispatch policy is specified.

In an embodiment, partition administrators can optionally overwrite the partition work managers for their own respective partitions. Each application within that partition can be given an instance of the partition work manager that are created using the partition-specific configuration for that work manager. For a partition work manager that is not overridden in the partition level, the template configuration in the config.xml level would be used when creating instances of such work managers for each deployed application in the partition, subject to any partition-specific limit set forth by the system administrator, as set forth above with respect to partition work managers.

For example, in an embodiment, a default work manager is configured with no minimum or maximum thread constraints, and additionally assigns a fair share request class value of 50 to a partition. The partition administrator can override the default work manager in their respective partition with a minimum threads constraint of 1. As a result, each deployed application within the partition would then have a default work manager created with a minimum threads constraint whose configured value is 1.

In accordance with an embodiment, although a partition administrator can rewrite the fair share value assigned to their particular partition, this does not change the fair share as assigned to the partition at the partition work manager. For example, partition X and partition Y are each assigned a fair share value of 50 by a system administrator in the configuration of the partition work manager. The partition administrator for partition X, however, sets their fair share value at 90 in their work manager. Despite the partition administrator attempting to claim more than their fair share of the threads, the partition work manager can ensure that partition X only receives half of the threads in the pool.

In an embodiment, constraints defined at a system level, e.g., in self-tuning section in config.xml, are shared. For example, a partition work manager is created and defines a minimum threads constraint called min-ThreadConstraint-1. Each partition will get a copy of min-ThreadConstraint-1. As discussed above, a partition administrator can override the min-ThreadConstraint-1 if desired.

In accordance with an embodiment, the application server environment 700 can comprise a multitenant application server (MT) environment.

Figure 8:
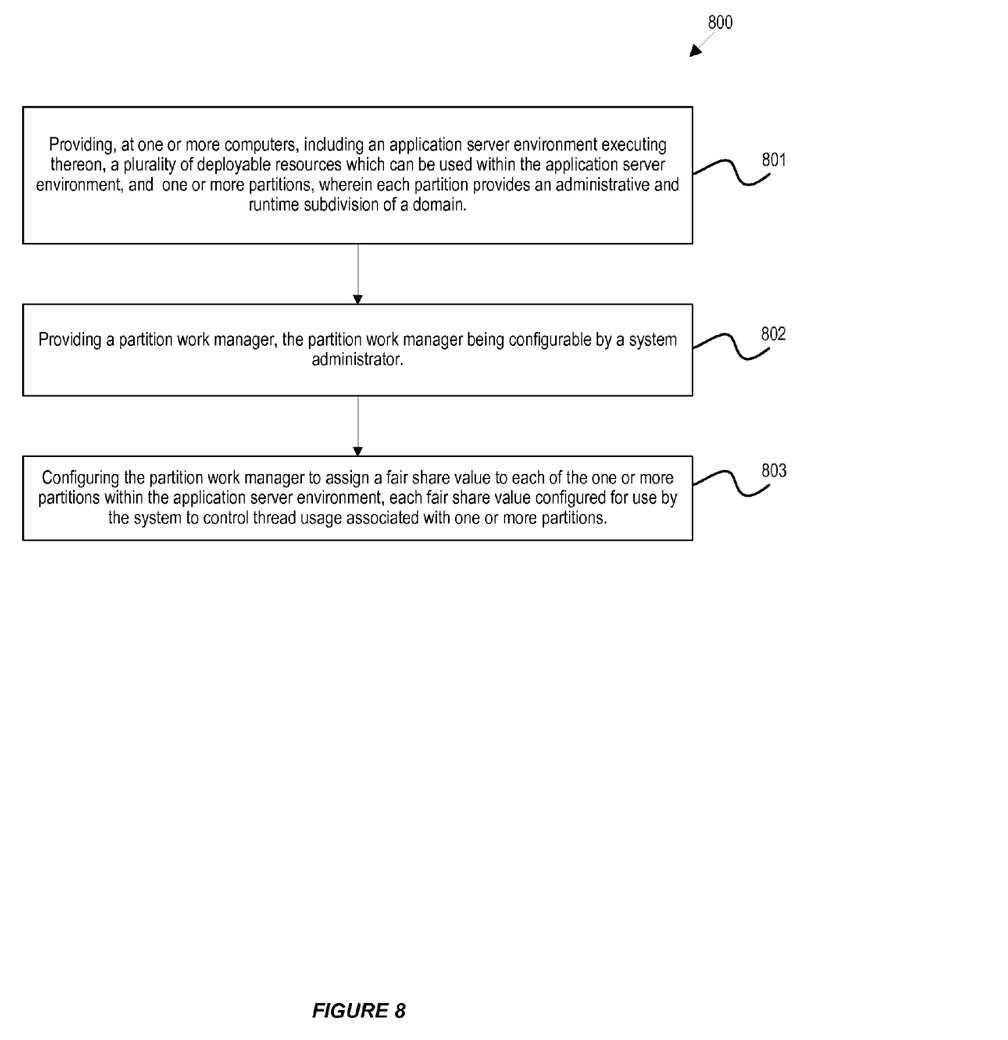
FIG. 8 is a flow chart of an exemplary method for providing a work manager for use in a multitenant application server environment.

FIG. 8 is a flow chart of an exemplary method 800 for providing a work manager for use in an application server environment. The method 800 can begin at step 801 with providing, at one or more computers, including an application server environment executing thereon, a plurality of deployable resources which can be used within the application server environment, one or more resource group templates, which define groupings of deployable resources within a domain, and one or more partitions, wherein each partition provides an administrative and runtime subdivision of the domain. The method 800 can proceed at step 802 with providing a partition work manager, the partition work manager being configurable by a system administrator. The exemplary method 800 can conclude at step 803 with configuring a partition work manager to assign a fair share value to each of the one or more partitions within the application server environment, each fair share value configured for use by the system to control thread usage associated with one or more partitions.

In accordance with an embodiment, and not shown in FIG. 8, the method can proceed with configuring the partition work manager to provide, in addition to the fair share value, one or more of the following: a partition capacity constraint, a partition minimum threads constraint limit, and a partition maximum threads constraint.

Figure 9:
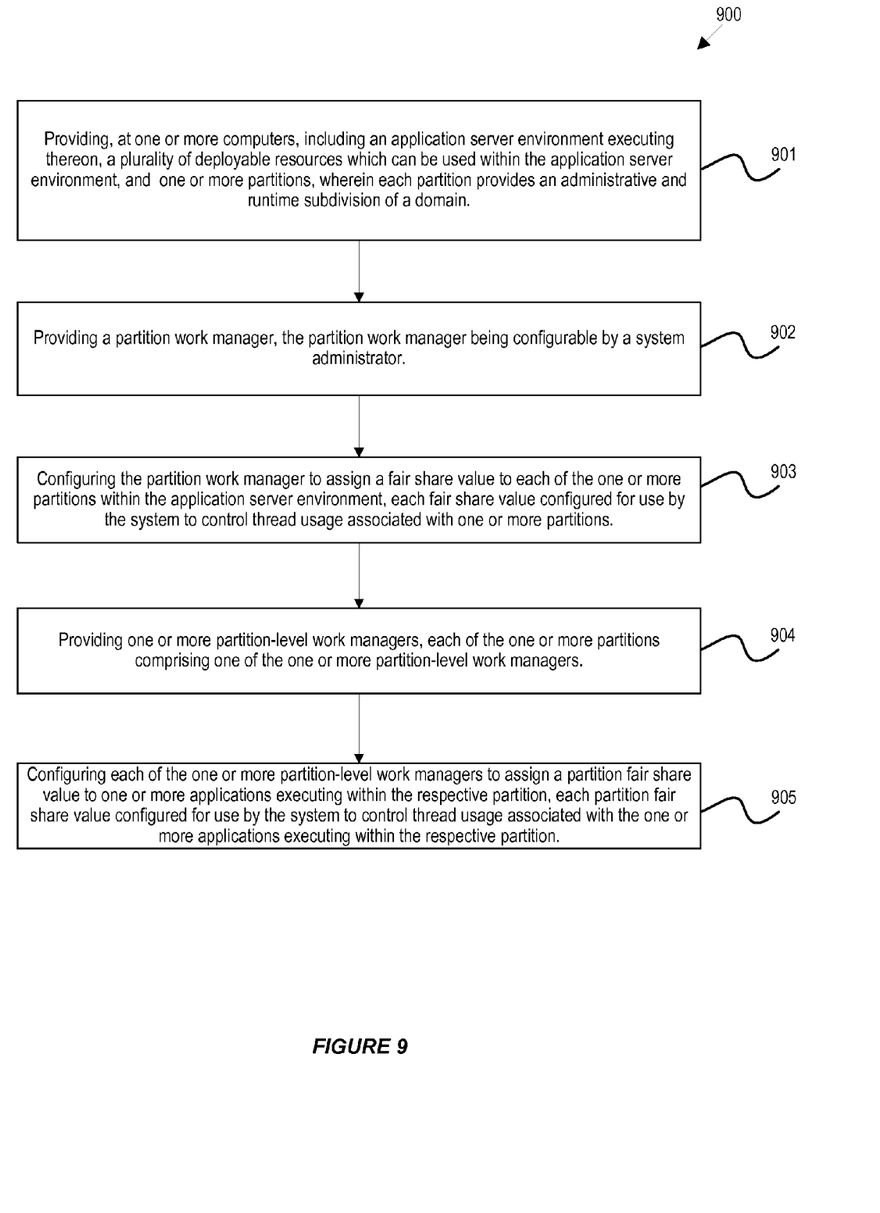
FIG. 9 is a flow chart of an exemplary method for providing a work manager for use in a multitenant application server environment.

FIG. 9 is a flow chart of an exemplary method 900 for providing a work manager for use in an application server environment. The method 900 can begin at step 901 with providing, at one or more computers, including an application server environment executing thereon, a plurality of deployable resources which can be used within the application server environment, one or more resource group templates, which define groupings of deployable resources within a domain, and one or more partitions, wherein each partition provides an administrative and runtime subdivision of the domain. The method 900 can proceed at step 902 with providing a partition work manager, the partition work manager being configurable by a system administrator. The exemplary method 900 can continue at step 903 with configuring a partition work manager to assign a fair share value to each of the one or more partitions within the application server environment, each fair share value configured for use by the system to control thread usage associated with one or more partitions. The method 900, at a step 904, provides one or more partition-level work managers, each of the one or more partitions comprising one of the one or more partition-level work managers. Finally, the method 900 concludes with configuring each of the one or more partition-level work managers to assign a partition fair share value to one or more applications executing within the respective partition, each partition fair share value configured for use by the system to control thread usage associated with the one or more applications executing within the respective partition.

Application Work Managers

In an embodiment, work managers and its artifacts (such as constraints) can be defined from within an application. When such an application defines a work manager and/or its constraints, such work managers can be deployed within a partition. However, the defined work manager and/or its constraints can be adjusted based on any configured limitations and work managers (e.g., a fair share value) that have been imposed by a system administrator via a partition work manager, or by a partition administrator via a defined partition-level work manager.

Partition ID Propagation

In an embodiment, the partition ID from which a work request is scheduled and/or requested can be propagated to the self-tuning thread pool where the work request is being run. The partition ID can be taken from the component invocation context (CIC). This allows for the work requests to be run under the context of the partition from which the request originated. This can allow for support of error logging and diagnostics and/or security.

The present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing a work manager for use in an application server environment, comprising:
one or more computers, including an application server that enables deployment and execution of software applications, wherein the application server is associated with a domain configuration that is used at runtime to define a domain for execution of the software applications, and a plurality of partitions,
wherein each of the plurality of partitions are associated with a partition configuration, and wherein each partition provides a subdivision of the domain and includes one or more resource groups;
a partition work manager configured to assign a fair share value to each of the plurality of partitions within the application server environment, each fair share value configured for use by the system to control thread usage associated with software applications executing in each of the plurality of partitions; and
a plurality of partition-level work managers, wherein each partition of the plurality of partitions is associated with a different partition-level work manager of the plurality of partition-level work managers, and wherein an initial configuration of each of the partition-level work managers is determined by the configuration of the partition work manager.

2. The system of claim 1, wherein the partition work manager is further configured to provide a minimum threads constraint value for each partition within the application server, the minimum threads constraint value configured for use by the system to control the thread usage associated with the plurality of partitions.

3. The system of claim 1, wherein the partition work manager is further configured to provide a partition capacity constraint value for each partition within the application server, the partition capacity constraint value configured for use by the system to limit a number of work requests from each partition.

4. The system of claim 1, wherein each of the fair share values assigned to the plurality of partitions is a number between 1 and 99, with a sum of all the fair share values totaling 100.

5. The system of claim 1, wherein each of the fair share values is further configured for use by the system to, when a thread pool is fully occupied, order work requests from the respective partitions in a queue.

6. The system of claim 1,
wherein each of the plurality of partition-level work managers is configured, by a partition administrator, to assign a partition fair share value to one or more applications executing within the respective partition, each partition fair share value configured for use by the system to control thread usage associated with the one or more applications executing within the respective partition.

7. The system of claim 6, wherein a partition-level work manager of the plurality of partition-level work managers is reconfigured on receipt of instructions from an associated partition administrator.

8. The system of claim 1, wherein the application server environment comprises a multi-tenant application server environment, and wherein the system can associate the plurality of partitions with a tenant of a plurality of tenants, for use by the tenant.

9. A method for providing a work manager for use in an application server environment, comprising:
providing, at one or more computers, including an application server that enables deployment and execution of software applications, a plurality of partitions, wherein the application server is associated with a domain configuration that is used at runtime to define a domain for execution of the software applications,
wherein each of the plurality of partitions are associated with a partition configuration, and wherein each partition provides a subdivision of the domain and includes one or more resource groups;
providing a partition work manager, the partition work manager being configurable;
configuring the partition work manager to assign a fair share value to each of the plurality of partitions within the application server environment, each fair share value configured for use by the system to control thread usage associated with software applications executing in the plurality of partitions; and
providing a plurality of partition-level work managers, wherein each partition of the plurality of partitions is associated with a different partition-level work manager of the plurality of partition-level work managers, and wherein an initial configuration of each of the partition-level work managers is determined by the configuration of the partition work manager.

10. The method of claim 9, further comprising:
further configuring the partition work manager to provide a minimum threads constraint value for each partition within the application server environment, the minimum threads constraint value configured for use by the system to control the thread usage associated with the plurality of partitions.

11. The method of claim 9, further comprising:
further configuring the partition work manager to provide a partition capacity constraint value for each partition within the application server environment, the partition capacity constraint value configured for use by the system to limit a number of work requests from each partition.

12. The method of claim 9, wherein each of the fair share values assigned to the plurality of partitions is a number between 1 and 99, with a sum of all the fair share values totaling 100.

13. The method of claim 9, further comprising:
further configuring the partition work manager to provide a partition maximum threads constraint for each partition within the application server environment, the partition maximum threads constraint configured for use by the system to control the thread usage associated with the plurality of partitions.

14. The method of claim 9,
wherein each of the plurality of partition-level work managers is configured, by a partition administrator, to assign a partition fair share value to one or more applications executing within the respective partition, each partition fair share value configured for use by the system to control thread usage associated with the one or more applications executing within the respective partition.

15. The method of claim 14, wherein a partition-level work manager of the plurality of partition-level work managers is reconfigured on receipt of instructions from an associated partition administrator.

16. A non-transitory computer readable storage medium, including instructions stored thereon which when read and executed by one or more computers cause the one or more computers to perform the steps comprising:
providing, at one or more computers, including an application server that enables deployment and execution of software applications, a plurality of partitions, wherein the application server is associated with a domain configuration that is used at runtime to define a domain for execution of the software applications,
wherein each of the plurality of partitions are associated with a partition configuration, and wherein each partition provides a subdivision of the domain and includes one or more resource groups;
providing a partition work manager, the partition work manager being configurable;
configuring the partition work manager to assign a fair share value to each of the plurality of partitions within the application server environment, each fair share value configured for use by the system to control thread usage associated with software applications executing in the plurality of partitions; and
providing a plurality of partition-level work managers, wherein each partition of the plurality of partitions is associated with a different partition-level work manager of the plurality of partition-level work managers, and wherein an initial configuration of each of the partition-level work managers is determined by the configuration of the partition work manager.

17. The non-transitory computer readable storage medium of claim 16, the steps further comprising:
further configuring the partition work manager to provide a minimum threads constraint value for each partition within the application server environment, the minimum threads constraint value configured for use by the system to control the thread usage associated with the plurality of partitions; and
further configuring the partition work manager to provide a partition capacity constraint value for each partition within the application server environment, the partition capacity constraint value configured for use by the system to limit a number of work requests from each partition.

18. The non-transitory computer readable storage medium of claim 16, wherein each of the fair share values assigned to the plurality of partitions is a number between 1 and 99, with a sum of all the fair share values totaling 100.

19. The non-transitory computer readable storage medium of claim 16, wherein each of the fair share values is further configured for use by the system to, when a thread pool is fully occupied, order work requests from the respective partitions in a queue.

20. The non-transitory computer readable storage medium of claim 16,
   wherein each of the plurality of partition-level work managers is configured, by a partition administrator, to assign a partition fair share value to one or more applications executing within the respective partition, each partition fair share value configured for use by the system to control thread usage associated with the one or more applications executing within the respective partition.

* * * * *

UNITED STATES PATENT AND TRADEMARK OFFICE
CERTIFICATE OF CORRECTION

PATENT NO. : 10,027,595 B2
APPLICATION NO. : 14/747853
DATED : July 17, 2018
INVENTOR(S) : Lai et al.

Page 1 of 1

It is certified that error appears in the above-identified patent and that said Letters Patent is hereby corrected as shown below:

In the Specification

In Column 2, Line 18, delete "embodiment" and insert -- embodiment. --, therefor.

In Column 9, Line 47, delete "and or" and insert -- and/or --, therefor.

Signed and Sealed this
Ninth Day of April, 2019

Andrei Iancu
*Director of the United States Patent and Trademark Office*